United States Patent
Jeng et al.

(10) Patent No.: US 9,673,935 B2
(45) Date of Patent: Jun. 6, 2017

(54) DECODING METHOD AND MULTIMEDIA PLAYING SYSTEM

(71) Applicant: MStar Semiconductor, Inc., Hsinchu Hsien (TW)

(72) Inventors: You-Tsai Jeng, Hsinchu Hsien (TW); Tai-Lai Tung, Hsinchu Hsien (TW); Tung-Sheng Lin, Hsinchu Hsien (TW); Ching-Fu Lan, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 529 days.

(21) Appl. No.: 14/138,408

(22) Filed: Dec. 23, 2013

(65) Prior Publication Data

US 2014/0177732 A1 Jun. 26, 2014

(30) Foreign Application Priority Data

Dec. 26, 2012 (TW) .............................. 101150081 A

(51) Int. Cl.
*H04N 19/89* (2014.01)
*H04L 1/00* (2006.01)

(52) U.S. Cl.
CPC .......... *H04L 1/0071* (2013.01); *H04L 1/0047* (2013.01)

(58) Field of Classification Search
CPC ............ H04N 21/6112; H04N 21/4382; H04L 27/2666; H04L 27/2675; H04L 5/0048; H04L 5/0053
See application file for complete search history.

(56) References Cited

U.S. PATENT DOCUMENTS

| | | | | |
|---|---|---|---|---|
| 7,885,356 B2* | 2/2011 | Aizawa | ............. | H04L 25/03866 375/316 |
| 8,605,835 B2* | 12/2013 | Matsumura | ......... | H04L 27/2659 370/464 |
| 9,253,428 B2* | 2/2016 | Allison, III | ............... | H04N 5/40 |
| 2004/0260892 A1* | 12/2004 | Chang | ............... | H03M 13/2703 711/157 |
| 2005/0147186 A1* | 7/2005 | Funamoto | ........... | H04L 27/2605 375/324 |
| 2005/0163094 A1* | 7/2005 | Okada | ................. | H04L 27/2605 370/343 |
| 2005/0169166 A1* | 8/2005 | Okada | ................. | H04L 27/2656 370/208 |
| 2008/0136510 A1* | 6/2008 | Iida | ..................... | H04L 27/0014 329/307 |
| 2009/0060072 A1* | 3/2009 | Hamamoto | ........... | H04L 1/0047 375/260 |
| 2009/0232264 A1* | 9/2009 | Gu | ......................... | H04H 20/95 375/371 |

(Continued)

FOREIGN PATENT DOCUMENTS

CN 102437908 A 5/2012

*Primary Examiner* — Neil Mikeska
(74) *Attorney, Agent, or Firm* — Edell, Shapiro & Finnan, LLC

(57) ABSTRACT

By inserting a symbol start tag at a start of a data segment corresponding to each symbol of a multimedia data stream, and by inserting frame start tags at starts of different frames in a start data segment, data signals belonging to different channels can be precisely and rapidly classified and decoded when the multimedia data stream is performed with demodulation.

14 Claims, 4 Drawing Sheets

(56) References Cited

U.S. PATENT DOCUMENTS

| | | | |
|---|---|---|---|
| 2009/0319838 A1* | 12/2009 | Jones, Jr. | H03M 13/2732 714/704 |
| 2010/0007743 A1* | 1/2010 | Kim | H04L 7/042 348/194 |
| 2010/0080330 A1* | 4/2010 | Kawauchi | H04L 25/0232 375/348 |
| 2010/0254493 A1* | 10/2010 | Yang | H03M 13/253 375/340 |
| 2010/0283912 A1* | 11/2010 | Sun | H04L 1/0071 348/726 |
| 2010/0289943 A1* | 11/2010 | Tokoro | H04H 40/27 348/425.2 |
| 2011/0235721 A1* | 9/2011 | Chen | H03M 13/136 375/240.25 |
| 2011/0249777 A1* | 10/2011 | Lu | H04L 7/042 375/343 |
| 2012/0076252 A1* | 3/2012 | Futami | H04L 27/0012 375/376 |
| 2012/0201327 A1* | 8/2012 | Kim | H04L 1/1816 375/295 |
| 2012/0218952 A1* | 8/2012 | Kwon | H04W 72/042 370/329 |
| 2012/0294391 A1* | 11/2012 | Jeong | H04L 27/2656 375/316 |
| 2013/0094617 A1* | 4/2013 | Shirosugi | H04N 21/4882 375/340 |
| 2013/0271568 A1* | 10/2013 | Park | H04N 21/4345 348/43 |
| 2013/0286967 A1* | 10/2013 | Ji | H04W 72/0406 370/329 |
| 2016/0097835 A1* | 4/2016 | Zhang | G01S 5/0009 370/329 |

\* cited by examiner

DECODING METHOD AND MULTIMEDIA PLAYING SYSTEM

CROSS REFERENCE TO RELATED APPLICATIONS

This application claims priority under 35 U.S.C. 119 to Taiwan patent application, TW101150081, filed on Dec. 26, 2012, the disclosure of which is incorporated herein by reference.

BACKGROUND OF THE INVENTION

1. Field of the Invention

The present invention relates to a decoding method and a multimedia playing system, and more particularly, to a decoding method of using symbol start tags and frame start tags for precisely positioning data signals in order to decode multimedia data stream and multimedia playing system utilizing the decoding method.

2. Description of the Prior Art

Integrated Services Digital Broadcasting-Terrestrial (ISDB-T) is a digital broadcast standard adopted by several nations. One of its characteristics is to perform signal encodings and carrier modulations in each of three mutually independent layers. During the aforementioned signal encoding process, bit interleaving technology is used to spread out bits of the same data signal in order to prevent incorrect decoding and unrecoverable errors due to burst errors happen at a concentrated data signal. Burst errors may comprise time domain errors resulted from noise pulses and Doppler effects as well as frequency domain errors caused by carrier interferences and multiplexing decays. However, in order to perform bit interleaving technology, it is required to precisely position data signals in different independent layers; otherwise, it is easily leading to decoding error such that the receiver cannot correctly recover the data signals.

SUMMARY OF THE INVENTION

In order to precisely positioning data signals during demodulating and decoding processes and preventing decoding errors in ISDB-T receiver, the present invention provides a decoding method and a multimedia playing system utilizing the decoding method.

According to one embodiment of the present invention, a decoding method for decoding a multimedia data stream having a plurality of data segments, each of the data segments comprising a plurality of data sub-segments is provided. The decoding method comprises: providing a plurality of first tags respectively corresponding to the data segments, and providing a plurality of second tags respectively corresponding to data sub-segments of an initial data segment among the data segments; positioning the data segments according to the first tags, positioning the data sub-segments of each of the data segments according to the second tags, and accordingly processing the data sub-segments of each of the of data segments, respectively; and decoding the processed data sub-segments of each of the data segments to generate a plurality of multimedia sub-segments according to the second tags.

According to another embodiment of the present invention, a decoding method for decoding a multimedia data stream having a plurality of data segments, each of the data segments comprising a plurality of data sub-segments is provided. The decoding method comprises: providing a plurality of first tags respectively corresponding to the data segments; providing a plurality of second tags respectively corresponding to data sub-segments of an initial data segment of the data segments; positioning the data sub-segments in each of the data segments according to the first tags and the second tags, and accordingly determining demodulations to be performed for the data sub-segments in each of the data segments, respectively, and generating an informing signal; demapping and bit de-interleaving the data sub-segments in each of the data segments according to the informing signal to generate a plurality of de-interleaved data sub-segments for each of the data segments; demodulating the de-interleaved data sub-segments for each of the data segments according the determined demodulations, respectively, to generate a plurality of demodulated data sub-segments; and decoding the demodulated data sub-segments according to the second tags to generate a plurality of multimedia sub-segments.

According to another embodiment of the present invention, a multimedia playing system for decoding a multimedia data stream having a plurality of data segments, each of the data segments comprising a plurality of data sub-segments is provided. The multimedia data stream comprises a time de-interleaver, an interface module, a demapper, a bit de-interleaver, a plurality of demodulation modules, and a decoding module. The time de-interleaver is configured for providing a plurality of first tags respectively corresponding to the data segments of the multimedia data stream and providing a plurality of second tags respectively corresponding to data sub-segments of an initial data segment of the data segments. The interface module is configured for positioning the data sub-segments in each of the data segments according to the first tags and the second tags, and accordingly generating a control signal an informing signal. The demapper and the bit de-interleaver are configured for demapping and bit de-interleaving the data sub-segments in each of the data segments according to the informing signal to generate a plurality of de-interleaved data sub-segments for each of the data segments. The demodulation modules are configured for receiving and demodulating the de-interleaved data sub-segments, respectively, according to the control signal to generate a plurality of modulated data sub-segments. The decoding module is configured for decoding the plurality of modulated data sub-segments according to the second tags to generate a plurality of multimedia sub-segments.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
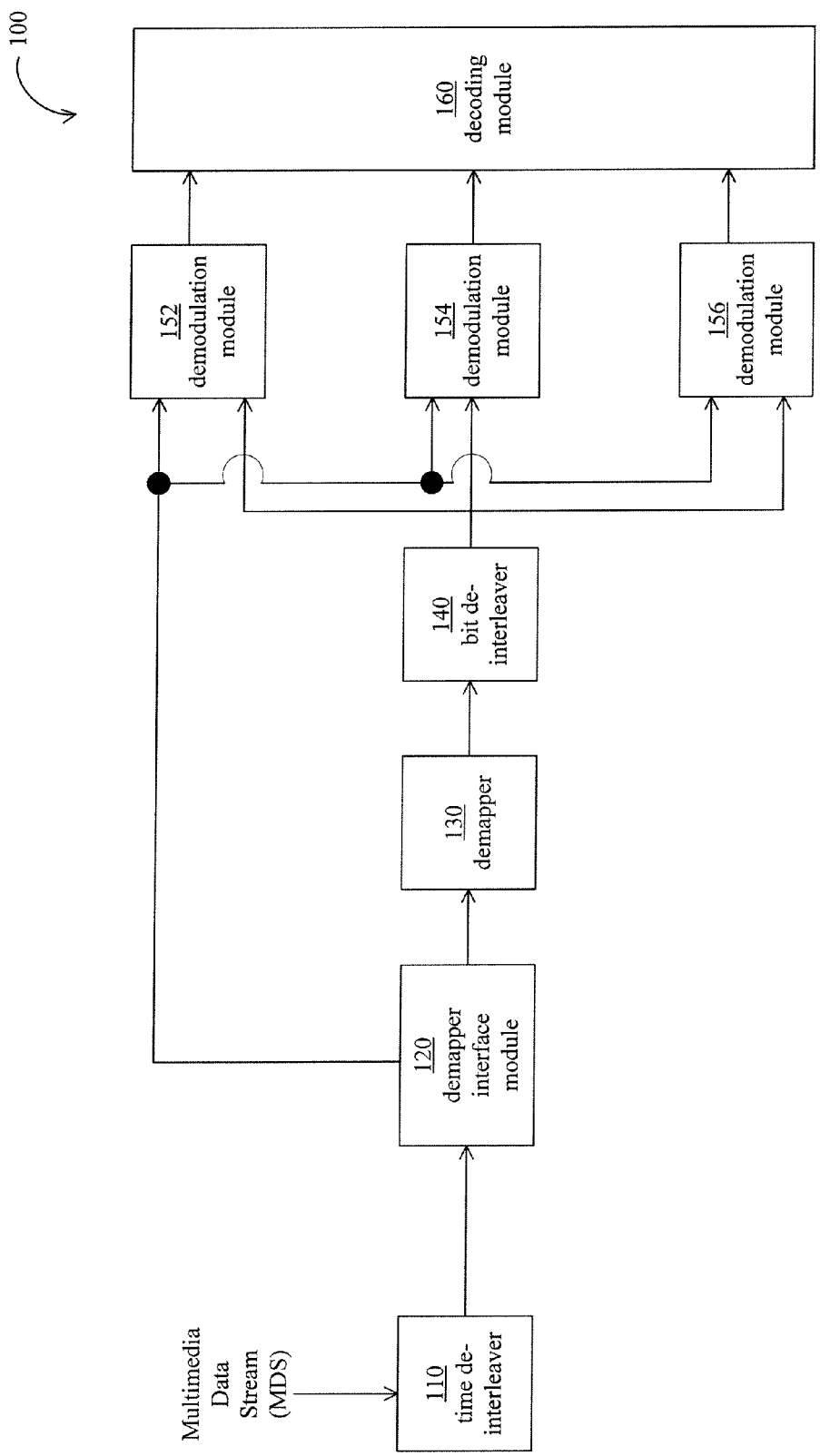
FIG. 1 is a block diagram of a multimedia playing system according to one embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

One purpose of decoding method disclosed by the present invention is to provide symbol start tags and frame start tags in multimedia data stream according to fixed rules. Therefore frames can be precisely positioned and dispatched to corresponding demodulation module for following demodulations accordingly. At the end, data correctness of multimedia sub-segments recovered from decoding of frames is improved as a result.

Please refer to FIG. 1, which is a block diagram of a multimedia playing system 100 according to one embodiment of the present invention. The multimedia playing system 100 can be installed in an ISDB-T compatible receiver for receiving a multimedia data stream MDS already processed by a frequency de-interleaver. The multimedia playing system 100 comprises a time de-interleaver 110, a demapper interface module 120, a demapper 130, a bit de-interleaver 140, a plurality of demodulation modules 152, 154, and 156, and a decoding module 160.

The brief operating flow of the multimedia playing system 100 is described as follows: (1) at first, the time de-interleaver 110 receives the multimedia data stream MDS and inserts symbol start tags and frame start tags in the multimedia data stream MDS according to fixed rules; (2) the demapper interface module 120 receives the multimedia data stream MDS with inserted symbol start tags and frame start tags from the time de-interleaver 110, perform data signal positioning in the multimedia data stream MDS according to the symbol start tags and the frame start tags, and accordingly determines demodulation modules corresponding to different frames of the multimedia data stream MDS for following demodulations, the determined demodulation modules include at least one of the demodulation modules 152, 154, and 156; (3) the demapper 130 and the bit de-interleaver 140 receive the multimedia data stream MDS including frames corresponding to determined demodulation modules from the demapper interface module 120, perform demapping and bit de-interleaving processes to output the de-interleaved data signal to the corresponding demodulation modules, respectively, determined by the demapper interface module 120; (4) the demodulation modules 152, 154, and 156 receive the de-interleaved data signal from the bit de-interleaver 140, respectively, and each of the demodulation modules 152, 154, and 156 processes the corresponding dispatched frames determined by the demapper interface module 120 to generate a plurality of demodulated data sub-segments; (5) the decoding module 160 receives the demodulated data sub-segments processed by corresponding demodulation modules 152, 154, and 156 and perform decoding on the demodulated data sub-segments to generate a plurality of multimedia sub-segments.

Figure 2:
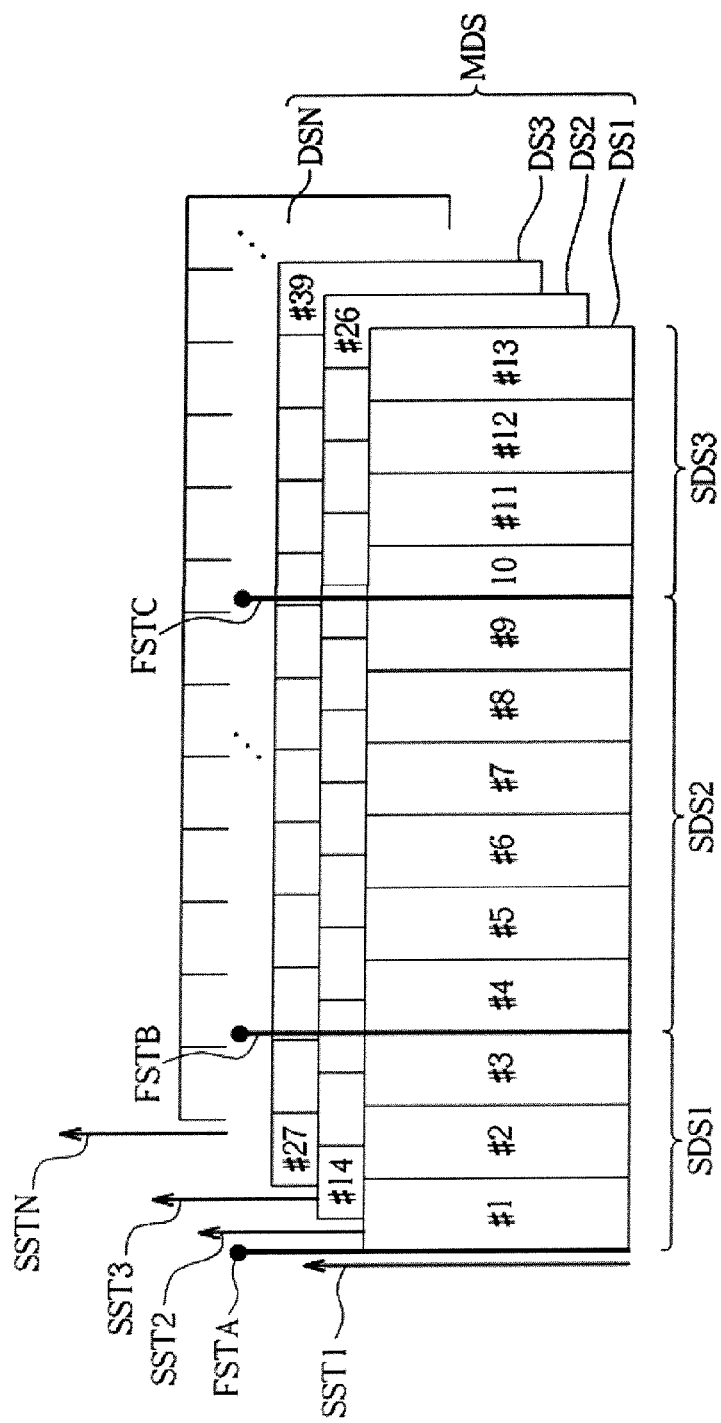
FIG. 2 is a diagram depicts that the time de-interleaver shown in FIG. 1 inserts symbol start tags and frame start tags in the multimedia data stream according to fixed rules.

Please refer to FIG. 2, which is a diagram depicts the fixed rules that the time de-interleaver 110 shown in FIG. 1 uses to insert symbol start tags and frame start tags in the multimedia data stream MDS. The fixed rules are determined based on a transmission and multiplexing configuration control (TMCC) information attached in the multimedia data stream MDS. According to the fixed rules shown in FIG. 2, the multimedia data stream MDS can be divided into a plurality of data segments DS1, DS2, DS3, . . . , and DSN. Each data segment has a same number of data signals. Each data segment corresponds to a single symbol in the multimedia data stream MDS. For example, in the first data segment DS1 of the multimedia data stream MDS, there are 13 data signals numbered as #1, #2, . . . , and #13. And carrier number of the data signal #1 is indicated as 1. Similarly, carrier numbers of data signals of the second data segment DS2 are #14, #15, . . . , and #26. The carrier numbers of rest of data signals in the multimedia data stream MDS could be concluded analogously.

In the data segment DS1, there are three data sub-segments SDS1, SDS2, and SDS3 with different sizes. The data sub-segment SDS1 includes three data signals corresponding to carrier numbers #1 to #3. The data sub-segment SDS2 includes six data signals corresponding to carrier numbers #4 to #9. The data sub-segments SDS3 include four data signals corresponding to carrier numbers #10 to #13. Each of the data sub-segments SDS1, SDS2, and SDS3 is respectively corresponding to one of three frames in the multimedia data stream MDS. And each of the three frames is corresponding to a different channel in which data signals are processed by a specific mapping, bit interleaving and modulation processes. Therefore, during the following de-mapping, bit de-interleaving and demodulation processes, these data sub-segments SDS1, SDS2, and SDS3 would be processed with corresponding de-mapping and bit de-interleaving processes and handled by different demodulation modules for demodulations. It is assumed that the data sub-segment SDS1 is corresponding to a first frame and a first channel in the multimedia data stream MDS, the data sub-segment SDS2 is corresponding to a second frame and a second channel in the multimedia data stream MDS, and the data sub-segment SDS3 is corresponding to a third frame and a third channel in the multimedia data stream MDS. With respect to the rest of data segments of the multimedia data stream MDS, they are formed in the same structure of the first data segment DS1, i.e., each of data segments include three data sub-segments which have three data signals corresponding to the first frame, six data signals corresponding to the second frame, and four data signals corresponding to the third frame in sequence. In other words, the first frame in each of the data segments is consisted of the first to the third data signals, the second frame in each of the data segments is consisted of the fourth to the ninth data signals, and the third frame in each of the data segments is consisted of the tenth to thirteenth data signals.

Figure 3:
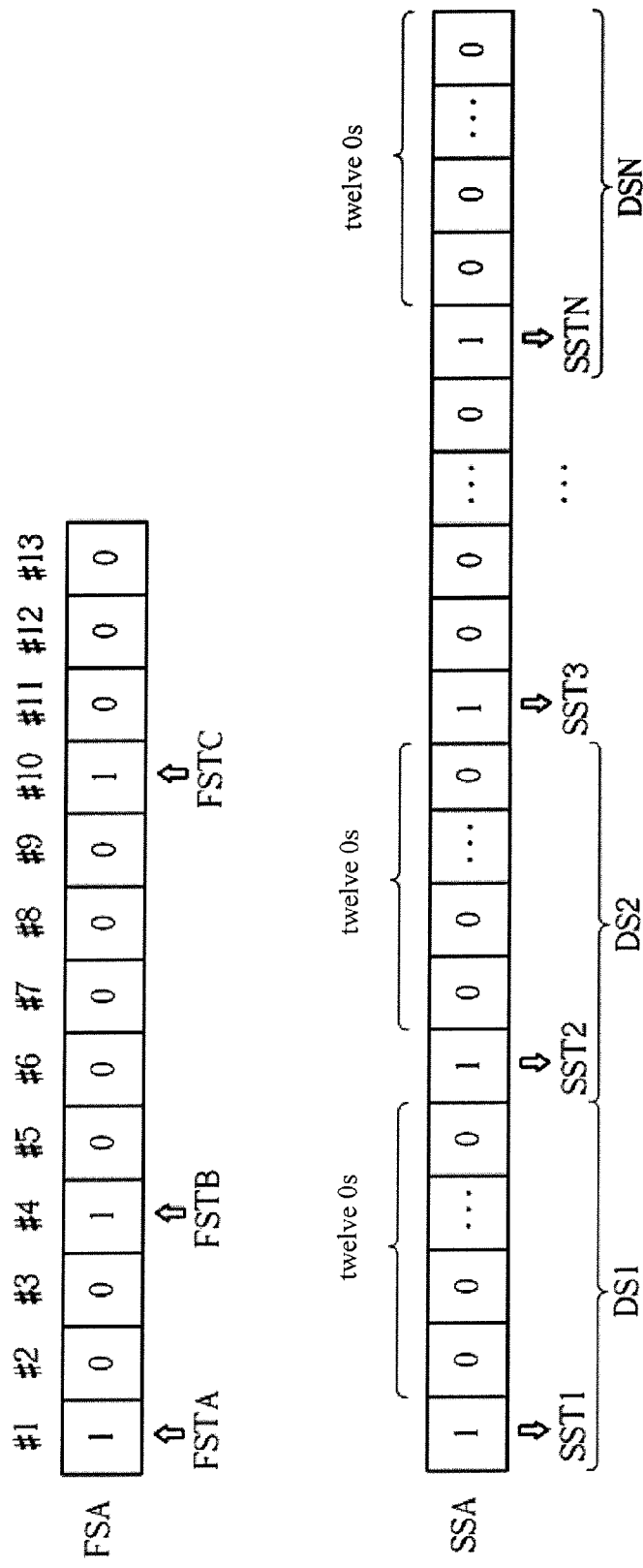
FIG. 3 is a diagram illustrates dynamical generations of frame start tag array and symbol start tag array for the multimedia data stream shown in FIG. 2 according to an embodiment of the present invention.

The time de-interleaver 110 takes advantage of the fixed structures of data segments and data sub segments to insert symbol start tags and frame start tags in the multimedia data stream MDS. Therefore, data signal positioning could be done by inserting few frame start tags. The process of inserting symbol start tags and frame start tags by the time de-interleaver 110 is shown in FIG. 2. Symbol start tags SST1, SST2, SST3, . . . , and SSTN are inserted to data segments DS1, DS2, DS3, . . . , and DSN, respectively. Frame start tags FSTA, FSTB, and FSTC are inserted to data sub segments SDS1, SDS2, SDS3, respectively. In one embodiment of the present invention, as shown in FIG. 3, a frame start tag array FSA and a symbol start tag array SSA are generated dynamically for the multimedia data stream MDS such that the inserted symbol start tags are labeled in the symbol start tag array SSA and the inserted frame start tags are labeled in the frame start tag array.

During the reception of the multimedia data stream MDS by the time de-interleaver 110, the total number of data signals and the size of single data segment of the multimedia data stream MDS are determined firstly according to TMCC information in order to determine the number of data segments and to generate the symbol start tag array SSA. The element number of the symbol start tag array SSA is equal to the number of data signals contained in the multimedia data stream MDS such that there is a one-to-one correspondence between the data signals in the multimedia data stream MDS and the elements of the symbol start tag array SSA. Assuming that a binary bit is used as the element value of the symbol start tag array SSA, value "1" of an array element represents that a symbol start tag is inserted into a data signal corresponding to the array element; otherwise, value "0" of the array element represents that no tag is inserted into the data signal corresponding to the array element. As shown in FIG. 3, each of the data segments has a corresponding element in the symbol start tag array SSA to be set as bit value "1" to mark starts of those data segments, i.e., the data signal positions inserted by symbol start tags SST1, SST2, SST3, . . . , and SSTN shown in FIG. 2. For a single data segment, corresponding values of the array elements in the symbol start tag array SSA are a single "1" bit followed by twelve "0" bits.

During the reception of the multimedia data stream MDS, the time de-interleaver 110 records the structure of the first data segment DS1 and generates the frame start tag array FSA accordingly such that the bit pattern of the frame start tag array FSA corresponding to the first data segment DS1 can be applied to the rest of data segments. As a result, the data sub-segments of each of the rest of data segments corresponding to different frames can be determined accordingly. As shown in FIG. 3, since the first data signal of the data sub-segment SDS1 is the first data signal of the data segment DS1, the first data signal of the data sub-segment SDS2 is the fourth data signal of the data segment DS1, and the first data signal of the data sub-segment SDS3 is the tenth data signal of the data segment DS1 shown in FIG. 2, the first, fourth, and tenth bits of the frame start tag array FSA are set as value "1" representing the data signal positions of inserted frame start tags FSTA, FSTB, and FSTB in the data segment DS1. Otherwise, the rest elements other than those are set as "1" are set as "0" in the frame start tag array FSA representing that no frame start tag symbol is inserted. Because frames that the data signals of each of the following data segments DS2, DS3, . . . , and DSN are corresponding to can be determined according to the frame start tag array FSA, and the structure of each data segment is the same, it does not need to insert frame start tags for the rest of data segments DS2, DS3, . . . , and DSN. It can save a lot of storing volume for recording frame start tag and a lot of time for reading the rest of data segments to determine which data signals are at the starts of frames.

After generating the symbol start tag array SSA and frame start tag array FSA, the insertion process of the time de-interleaver 110 is finished. The symbol start tag array SSA and the frame start tag array FSA can provide positioning and synchronizing features to the following components of the multimedia playing system 100 for processing the multimedia data stream MDS. The multimedia data stream MDS, the symbol start tag array SSA, and the frame start tag array FSA are output to the demapper interface module 120.

The demapper interface module 120 determines that which of the demodulation modules are dispatched to perform corresponding bit interleaving demodulations for the first, the second, and the third frames, respectively, according to the TMCC information of the multimedia data stream MDS, the symbol start tags and the frame start tags. The demapper interface module 120 generates a control signal indicating the determination result to control the demodulation modules 152, 154, and 156. It is assumed that the demapper interface module 120 determines that the data signals of the first frame is dispatched to the demodulation module 152, the data signals of the second frame is dispatched to the demodulation module 154, the data signals of the third frame is dispatched to the demodulation module 156.

In one embodiment, the demapper interface module 120 performs the following three stages according to the symbol start tags and the frame start tags: (1) extracting permutation and sizes of data sub-segments of the first data segment DS1 in the multimedia data stream MDS; (2) positioning the data sub-segments of the rest of data segments DS2, DS3, . . . , and DSN according to the extracted permutation and sizes; (3) dispatching data sub-segments in each data segment to corresponding demodulation module for demodulation according to the positioning results.

In the first stage, the demapper interface module 120 reads the frame start tag array FSA to find out the inserted frame start tags FSTA, FSTB, and FSTB of the data segment DS1, and accordingly determines that the carrier numbers corresponding to the inserted frame start tags FSTA, FSTB, and FSTB in the data segment DS1 are #1, #4, and #10. It means a rule of start positions of different data sub-segments in each data segment are the first, the fourth, and the tenth data signals.

In the second stage, the demapper interface module 120 reads the symbol start tag array SSA for determining all of start positions of data segments in the multimedia data stream MDS, i.e., the data signals corresponding to carrier numbers #1, #14, #27, and so on. In the consequence, all data segments in the multimedia data stream MDS are positioned. After that, according to the rule found in the first stage, start data signals (e.g., corresponding to carrier numbers #1, #4, and #10) of different data sub-segments in each data segment are found out for positioning all of data sub-segments in each data segments.

In the third stage, the demapper interface module 120 determines assignments of the demodulation modules 152, 154, and 156, de-mapping and bit de-interleaving processes for each of the data sub-segments in each data segments according to the positioning result in the second stage. For example, assuming that the first, the second, and the third frames are dispatched to the demodulation modules 152, 154, and 156, respectively, for demodulation, the data sub-segment SDS1 is demodulated by the demodulation module 152 for generating a first demodulated data sub-segment, the data sub-segment SDS2 is demodulated by the demodulation module 154 for generating a second demodulated data sub-segment, and the data sub-segment SDS3 is demodulated by the demodulation module 156 for generating a third demodulated data sub-segment. In one embodiment, the demapper interface module 120 generates a control signal to control the demodulation modules 152, 154, and 156 to receive and demodulate the data sub-segments in each data segments, respectively. The demapper interface module 120 further generates an informing signal indicating which type of de-mapping and bit de-interleaving process to be performed for each of the data sub-segments to the demapper 130 and the bit de-interleaver 140.

Since the positions of each data sub-segments are determined according to the frame start tag array FSA and the symbol start tag array SSA as well as the technical characteristics that each data segment has the same structure, i.e., sizes and permutation of data sub-segments, the positioning can be done quickly and precisely without individually considering each data signal to be dispatched to which demodulation module to avoid chaos in processing data signals.

The demapper 130 and the bit de-interleaver 140 receive the multimedia data stream MDS and perform de-mapping and bit de-interleaving processes to each of the data sub-segments in each data segments according to the informing signal received from the demapper interface module 120 to generate a plurality of de-interleaved data sub-segments.

The demodulation modules 152, 154, and 156 receive the de-interleaved data sub-segments, respectively, according to the control signal from the demapper interface module 120 and demodulate the de-interleaved data sub-segments to generate a plurality of demodulated data sub-segments.

At last, the decoding module 160 collects the plurality of demodulated data sub-segments, performs decoding process to the demodulated data sub-segments according to the start position rule of data sub-segments recorded in the frame start tag array FSA, and generates a plurality of multimedia sub-segment to be played for realizing the playing function of the multimedia playing system 100.

In some embodiments of the present invention, the decoding process performed by the decoding module 160 may comprises depuncturing, Viterbi decoding, bit-to-byte transformation, energy dispersal in unit of byte, and Reed-Solomon decoding processes. All of these procedures need positions denoted by the frame start tags for synchronizing purpose to independently handle the data signals belonging to different channels.

In one embodiment of the present invention, the data signal may be orthogonal frequency division multiplexing OFDM signal. The demodulation modules corresponding to different frame or data sub-segment may perform demodulations for 16-point quadrature amplitude modulation (QAM-16), 64-point quadrature amplitude modulation (QAM-64), and 4-bit quadrature phase-shift keying QPSK.

Please be aware that the number of data signals in the data segment (size of data segment) or the number of data signals in the data sub-segment (size of data sub segment) may be varied in some implementations, these implementations are also embodiments of the present invention.

Figure 4:
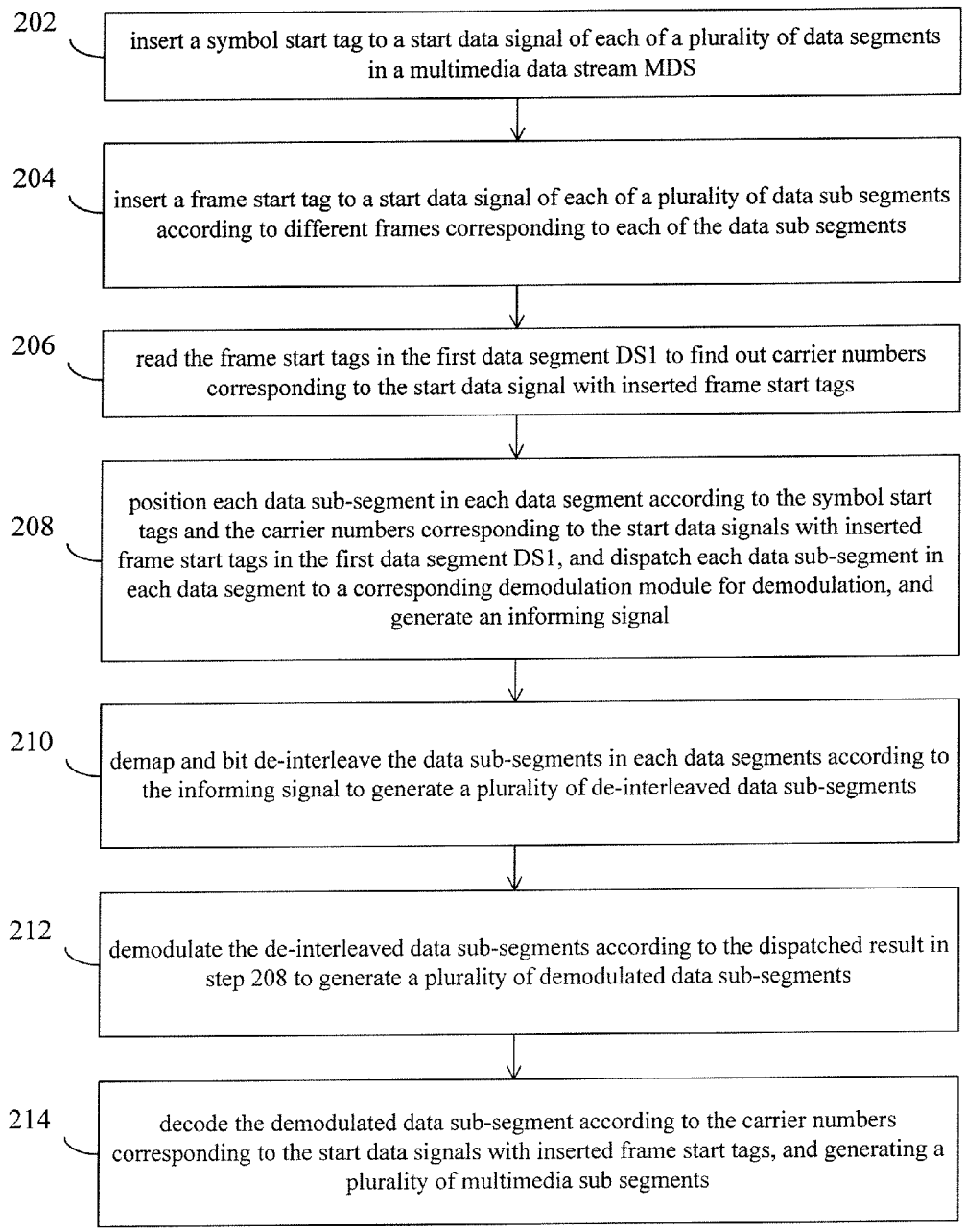
FIG. 4 is a flowchart diagram of the decoding method disclosed by one embodiment of the present invention.

Please refer to FIG. 4, which is a flowchart diagram of the decoding method disclosed by one embodiment of the present invention. The details of the decoding method are already described in the paragraphs related to FIG. 1 to FIG. 3 above. The decoding method comprises the following steps.

Step 202: inserting a symbol start tag to a start data signal of each of a plurality of data segments in a multimedia data stream MDS received by a multimedia playing system 100 is performed.

Step 204: inserting a frame start tag to a start data signal of each of a plurality of data sub-segments in the first data segment DS1 of the data segments according to different frames corresponding to each of the data sub-segments is performed.

Step 206: reading all inserted frame start tags in the first data segment DS1 to find out carrier numbers corresponding to the start data signal with inserted frame start tags is performed.

Step 208: positioning each data sub-segment in each data segment according to the symbol start tags and the carrier numbers corresponding to the start data signals with inserted frame start tags in the first data segment DS1, and dispatching each data sub-segment in each data segment to a corresponding demodulation module for demodulation, and generating an informing signal indicating the type of de-mapping and bit de-interleaving process to be performed for each of the data sub-segments are performed.

Step 210: demapping and bit de-interleaving the data sub-segments in each data segments according to the informing signal to generate a plurality of de-interleaved data sub-segments are performed.

Step 212: demodulating the de-interleaved data sub-segments according to the dispatched result in step 208 to generate a plurality of demodulated data sub-segments is performed.

Step 214: decoding the demodulated data sub-segment according to the carrier numbers corresponding to the start data signals with inserted frame start tags, and generating a plurality of multimedia sub segments to be played is performed.

Please be aware that any implementations include any reasonable permutation and/or combination of steps shown in FIG. 4 as well as any mentioned limitations or characteristics should be viewed as embodiments of the present invention.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A decoding method applied to a multimedia playing system for decoding a multimedia data stream having a plurality of data segments, each of the data segments comprising a plurality of data sub-segments, comprising:
    providing a plurality of first tags respectively corresponding to the data segments, and providing a plurality of second tags respectively corresponding to data sub-segments of an initial data segment among the data segments;
    positioning the data segments according to the first tags, positioning the data sub-segments of each of the data segments according to the second tags, and accordingly processing the data sub-segments of each of the of data segments, respectively; and
    decoding the processed data sub-segments of each of the data segments to generate a plurality of multimedia sub-segments according to the second tags,
    wherein the first tags and second tags are inserted in the multimedia data stream according to transmission and multiplexing configuration control (TMCC) information contained in the multimedia data stream.

2. The decoding method of claim 1, wherein each of the data segments corresponds to a symbol.

3. The decoding method of claim 1, wherein each of the data sub-segments corresponds to a frame.

4. The decoding method of claim 3, wherein the step of accordingly processing the data sub-segments of each of the data segments, respectively, comprises:
    performing demodulation on each of the data sub-segments according to the corresponding frame.

5. The decoding method of claim 1, further comprising:
    determining demodulations to be performed to the data sub-segments of each of the data segments, respectively, according to the TMCC information.

6. A decoding method applied to a multimedia playing system for decoding a multimedia data stream having a plurality of data segments, each of the data segments comprising a plurality of data sub-segments, comprising:

inserting a plurality of first tags in the multimedia data stream respectively corresponding to the data segments;

inserting a plurality of second tags in the multimedia data stream respectively corresponding to data sub-segments of an initial data segment of the data segments;

positioning the data sub-segments in each of the data segments according to the first tags and the second tags, and accordingly determining demodulations to be performed for the data sub-segments in each of the data segments, respectively, and generating an informing signal;

demapping and bit de-interleaving the data sub-segments in each of the data segments according to the informing signal to generate a plurality of de-interleaved data sub-segments for each of the data segments;

demodulating the de-interleaved data sub-segments for each of the data segments according to the determined demodulations, respectively, to generate a plurality of demodulated data sub-segments; and decoding the demodulated data sub-segments according to the second tags to generate a plurality of multimedia sub-segments, wherein the plurality of first tags and the plurality of second tags are inserted in the multimedia data stream according to transmission and multiplexing configuration control (TMCC) information contained in the multimedia data stream.

7. The decoding method of claim 6, further comprising:
determining the data segments of the multimedia data stream according to the TMCC information contained in the multimedia data stream.

8. The decoding method of claim 7, wherein the step of determining the data segments of the multimedia data stream according to the TMCC information contained in the multimedia data stream further comprising:
determining properties of the data sub-segments of each of the data segments according to the TMCC information.

9. The decoding method of claim 6, each of the data sub-segments comprising a plurality of data signals with different carrier numbers, the decoding method further comprising:
obtaining carrier numbers corresponding to the data sub-segments of the initial data segment according to the second tags.

10. The decoding method of claim 6, wherein each of the data segments corresponds to a symbol, and each of the data sub-segments corresponds to a frame.

11. A multimedia playing system, for decoding a multimedia data stream having a plurality of data segments, each of the data segments comprising a plurality of data sub-segments, comprising:
a time de-interleaver, configured for inserting a plurality of first tags into the multimedia data stream respectively corresponding to the data segments of the multimedia data stream and inserting a plurality of second tags into the multimedia data stream respectively corresponding to data sub-segments of an initial data segment of the data segments;
an interface module, configured for positioning the data sub-segments in each of the data segments according to the first tags and the second tags, and accordingly generating a control signal an informing signal;
a demapper and a bit de-interleaver, configured for demapping and bit de-interleaving the data sub-segments in each of the data segments according to the informing signal to generate a plurality of de-interleaved data sub-segments for each of the data segments;
a plurality of demodulation modules, configured for receiving and demodulating the de-interleaved data sub-segments, respectively, according to the control signal to generate a plurality of modulated data sub-segments; and
a decoding module, configured for decoding the plurality of modulated data sub-segments according to the second tags to generate a plurality of multimedia sub-segments,
wherein the time de-interleaver determines the data segments according to a transmission and multiplexing configuration control (TMCC) information contained in the multimedia data stream and inserts the plurality of first tags and the plurality of second tags in the multimedia data stream according to the TMCC information contained in the multimedia data stream.

12. The multimedia playing system of claim 11, wherein the time de-interleaver determines properties of the data sub segments in each of the data segments according to the TMCC information.

13. The multimedia playing system of claim 11, wherein the demodulation modules performs a plurality of demodulations, respectively, controlled by the control signal.

14. The multimedia playing system of claim 11, wherein each of the data segments corresponds to a symbol, and each of the data sub-segments corresponds to a frame.

* * * * *